(12) United States Patent
Fossey, Jr. et al.

(10) Patent No.: US 8,025,752 B2
(45) Date of Patent: Sep. 27, 2011

(54) METHOD OF FABRICATING CONDUCTIVE COMPOSITES

(75) Inventors: William H. Fossey, Jr., Bedford, MA (US); Laura A. Cuthbert, Watertown, MA (US); Joseph A. Sarcione, Millbury, MA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 12/378,613

(22) Filed: Feb. 18, 2009

(65) Prior Publication Data

US 2010/0206465 A1    Aug. 19, 2010

(51) Int. Cl.
| | | |
|---|---|---|
| B32B 37/00 | (2006.01) | |
| B32B 37/14 | (2006.01) | |
| H05K 9/00 | (2006.01) | |
| H05F 3/00 | (2006.01) | |
| B60C 19/08 | (2006.01) | |

(52) U.S. Cl. ........... 156/155; 156/307.5; 156/307.7; 174/350; 174/351; 174/393; 361/216; 361/217; 361/218

(58) Field of Classification Search ............. 156/155, 156/307.5, 307.7; 174/350, 351, 393; 361/216, 361/217, 218
See application file for complete search history.

(56) References Cited

U.S. PATENT DOCUMENTS

| | | | | |
|---|---|---|---|---|
| 4,746,389 | A * | 5/1988 | DiGenova ............... 156/247 |
| 5,177,591 | A * | 1/1993 | Emanuel ............... 257/674 |
| 5,250,342 | A * | 10/1993 | Lang et al. ............... 428/138 |
| 5,470,413 | A * | 11/1995 | Cedarleaf ............... 156/90 |
| 6,496,151 | B1 * | 12/2002 | Ferreri et al. ............... 343/708 |
| 6,517,658 | B1 * | 2/2003 | Wageman et al. ............... 156/247 |

* cited by examiner

*Primary Examiner* — Philip Tucker
*Assistant Examiner* — Nickolas Harm
(74) *Attorney, Agent, or Firm* — Iandiorio Teska & Coleman

(57) ABSTRACT

A method of fabricating a conductive composite wherein at least one predetermined electrical access area of a conductive material is coated with a maskant. The conductive material is included in a composite ply lay-up which is cured and then the maskant is removed from the conductive material.

22 Claims, 4 Drawing Sheets

METHOD OF FABRICATING CONDUCTIVE COMPOSITES

FIELD OF THE INVENTION

This subject invention relates to composite materials.

BACKGROUND OF THE INVENTION

Composite materials (made of fibers in a resin matrix) are light weight but strong and thus are widely used in a variety of applications. Composites, however, are typically non-conductive which can be problematic when structures made from composite materials must be grounded or protected against electromagnetic interference, lightning, or the like.

So, those skilled in the art in composite technology may incorporate a conductive metal mesh layer into the composite ply lay-up. During curing of the lay-up, however, the composite resin infiltrates the metal mesh material rendering it non-conductive. Attempts at removing the resin from the metal mesh by abrasion (e.g., grit blasting or sanding operations) are less than satisfactory. The result was often a non-uniform surface, incomplete removal of the resin, and removal of or damage to the metal mesh material. Attempts to use peel plies in the composite lay-up in the area that was required to be resin free were also less than satisfactory since resin often still coated the metallic mesh material.

BRIEF SUMMARY OF THE INVENTION

It is therefore an object of this invention to provide an improved method of fabricating conductive composite components.

It is a further object of this invention to provide such a method which does not require grit blasting or sanding operations.

It is a further object of this invention to provide such a method which is more reliable and repeatable.

It is a further object of this invention to provide such a method which is easy to implement.

It is a further object of this invention to provide such a method which is more precise.

The subject invention results from the realization that a composite panel or part or component can be rendered conductive at one or more "electrical access areas" by masking the same with a later removable, typically liquid maskant during the cure cycle of the composite lay-up. The maskant is then removed revealing the conductive electrical access area.

The subject invention features a method of fabricating a conductive composite. The typical method involves coating at least one predetermined electrical access area of a conductive material with a maskant. The maskant may then be cured. The conductive material is included in a composite ply lay-up which is cured. Then, the maskant is removed from the conductive material resulting in a highly conductive electrical access area free of resin from the lay-up cure cycle.

Typically, the conductive material is masked except at the electrical access area prior to coating and that mask is removed after curing. The mask may be tape and/or film.

The conductive material can be a foil, or mesh material made of, for example, copper or stainless steel. Preferably, the mesh material is impregnated with the maskant. Curing the maskant typically includes heating.

The typical composite ply lay-up includes composite plies under the conductive material and at least one composite ply on the conductive material. The composite ply on the conductive material may be configured so as not to overlay the electrical access area of the conductive material. The composite plies can be pre-preg sheets including graphite epoxy, glass epoxy, cynate ester/quartz and any other type of pre-preg or resin/fiber combinations typical in the composite industry. The lay-up may further include release sheets.

Lay-up curing typically includes subjecting the lay-up to elevated temperatures and pressures. Removing the maskant can include brushing the electrical access area with a solution such as warm water.

The preferred maskant is water soluble and is able to withstand elevated temperatures and pressures used during lay-up curing.

One method of fabricating a conductive composite in accordance with the subject invention includes masking all but a predetermined electrical access area of a conductive material with a mask, coating the predetermine electrical access area of the conductive material with a liquid maskant, curing the liquid maskant, and removing the mask. The conductive material is included in a composite ply lay-up with composite plies under the conductive material and at least one composite ply on the conductive material. The lay-up is cured by subjecting it to elevated temperatures and pressures. The maskant is then removed from the conductive material. The maskant is preferably selected to withstand the elevated temperatures and pressures used during the lay-up curing step but also removable from the conductive material after curing of the lay-up.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
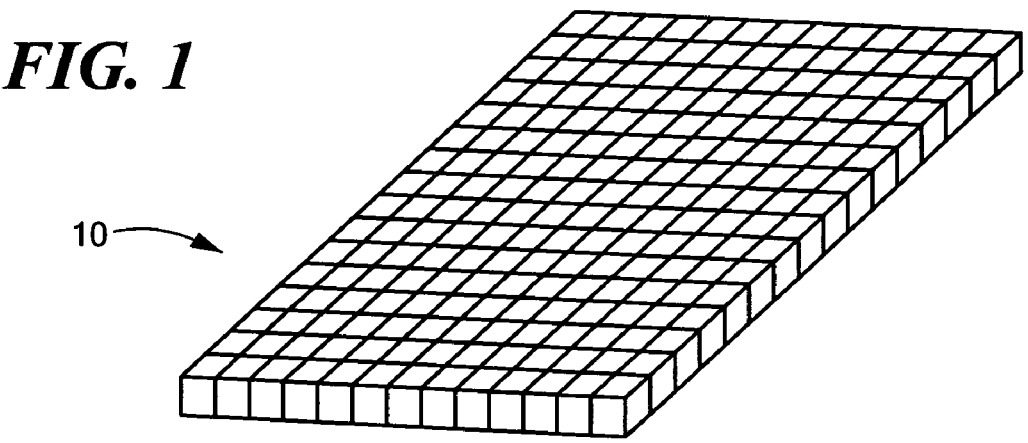
FIG. 1 is a highly schematic three-dimensional top view of a sheet of metal mesh conductive material to be included in a composite ply lay-up in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows metal mesh (e.g., copper or stainless steel) conductive material sheet 10 to be incorporated into a composite ply lay-up to render it conductive for grounding, electromagnetic interference protection, lightning strike protection, or the like.

In the resulting lay-up, an electrical access area is defined which, in one example, includes the border area of sheet 10. So, in FIG. 2, the interior of sheet 10 is masked with film and tape as shown at 12 (step 26, FIG. 5). Flashbreaker II tape about an FEP film may be used.

Figure 2:
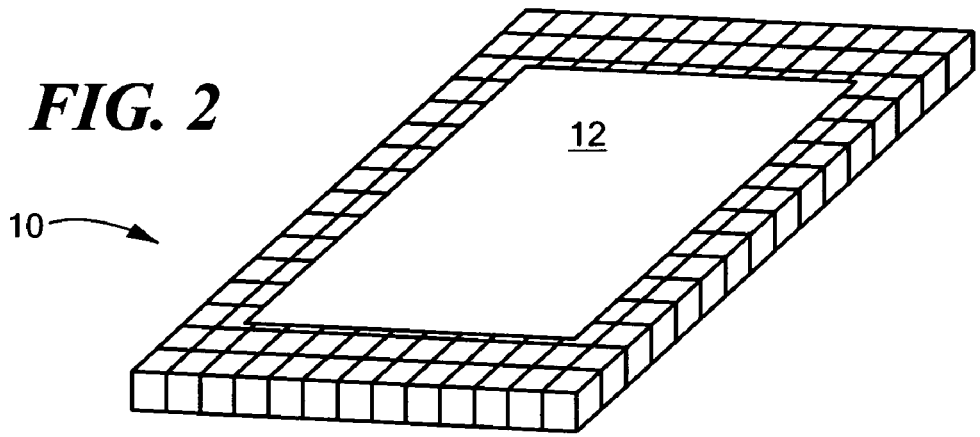
FIG. 2 is a highly schematic three-dimensional top view showing how the metal mesh material of FIG. 1 is masked prior to the application of the maskant used to prevent resin from infiltrating a predetermined electrical access area of the metal mesh material sheet.
Figure 3:
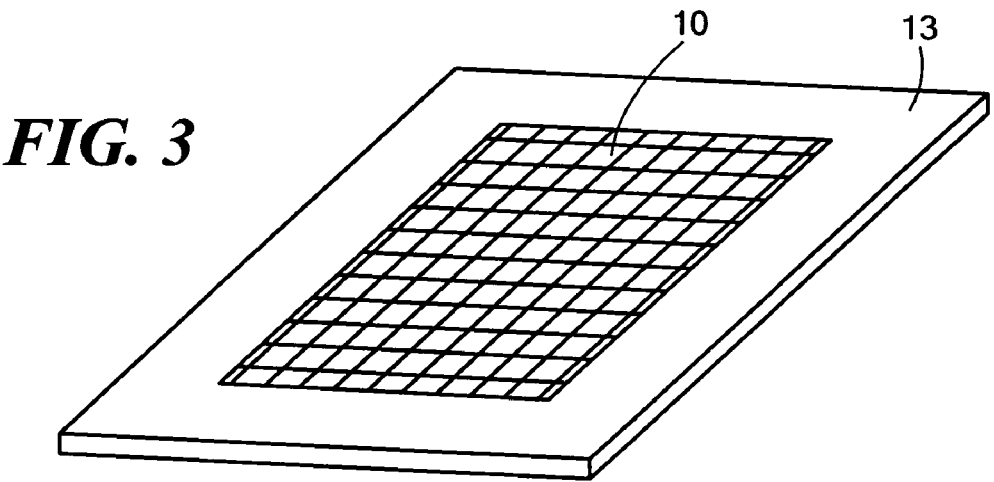
FIG. 3 is a highly schematic three-dimensional top view similar to FIG. 2 except now the maskant has been applied to the electrical access area of the metal mesh material, cured, and the mask shown in FIG. 2 removed.
Figure 5:
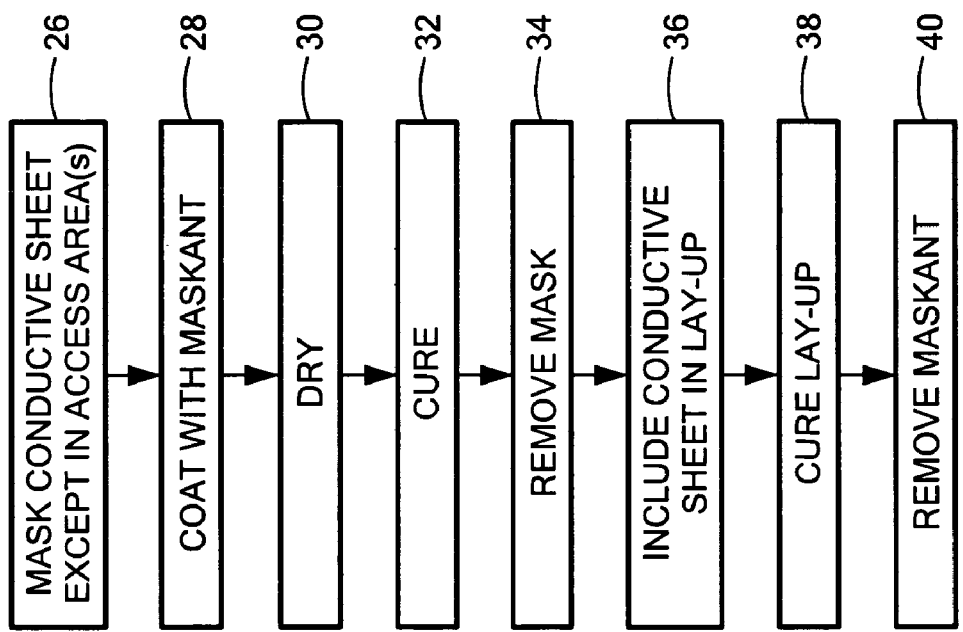
FIG. 5 is a flow chart depicting the primary steps associated with the method of the subject invention.

A liquid maskant is then applied to the unmasked border area of sheet 10, FIG. 2 (step 28, FIG. 5). The preferred maskant is water soluable and able to withstand elevated temperatures and pressures during the lay-up curing stage. During experiments, the sealant component of a material called Aquapour™ (Advanced Ceramics) was used and determined to be preferable. The sealant was mixed with water according to the manufacturer's recommendation to lower the viscosity of the sealant. This maskant was applied to the border area of the metal mesh layer by brushing, spreading, or scraping and allowed to dry at room temperature for one hour (step 30, FIG. 5). The maskant was then cured, step 32, by placing the conductive metal mesh layer in an oven with a 40 minute ramp up to 275° F. for one hour. The mesh sheet was then allowed to cool to room temperature and mask 12, FIG. 2 removed as shown in FIG. 3 (step 34, FIG. 5). Maskant 13 fully impregnated the metal mesh material at the electrical access border area thereof.

Figure 4:
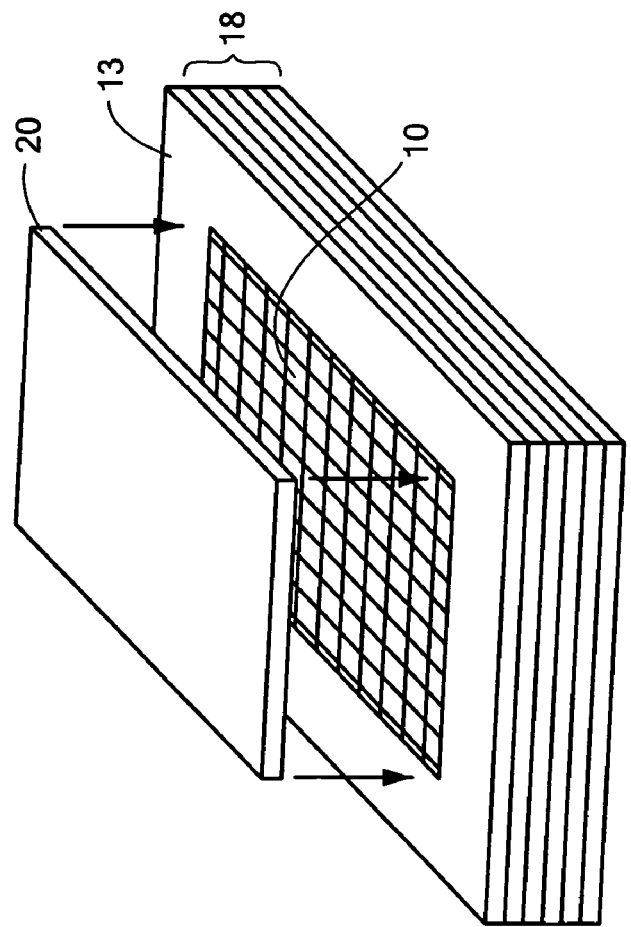
FIG. 4 is a schematic three-dimensional top view showing how the metal mesh material of FIG. 3 may be incorporated in a composite ply lay-up in accordance with the subject invention.

Metal mesh layer 10 with the border maskant was then included in composite ply lay-up 16, FIG. 4 (step 36, FIG. 5). One lay-up comprised eight composite plies 18 under metal mesh layer 10 and one composite ply layer 20 above metal mesh layer 10 as shown in FIG. 4. Typically, composite ply 20 does not extend over the border access area of metal mesh layer 10. The lay-up also included other layers and structures used in a typical composite forming and curing procedure such as a support plate, resin dams, release layers, breather cloths, and the like. Release layers may extend across the entire part and are typical of composite manufacturing. They also prevent surface resin flow across the maskant which would make removal more difficult. The composite plies may be pre-preg (FiberCote E765 graphite epoxy plain weave or carbon epoxies are commonly used). Cynate ester quartz may also be used.

This lay-up is then cured, step 38, FIG. 5 by placing the lay-up in a vacuum bag and this assembly is placed in an autoclave under, in one example, the following conditions.

|  | Ramp | Ramp | Hold | Ramp | Ramp | Ramp |
|---|---|---|---|---|---|---|
| Temp (° F.) | 70 | 270 | 270 | 160 | 160 | 70 |
| Pressure (psi) | 65 | 65 | 65 | 65 | 0 | 0 |
| Time (minutes) | 5 | 60 | 90 | 15 | 5 | 1 |

Figure 6:
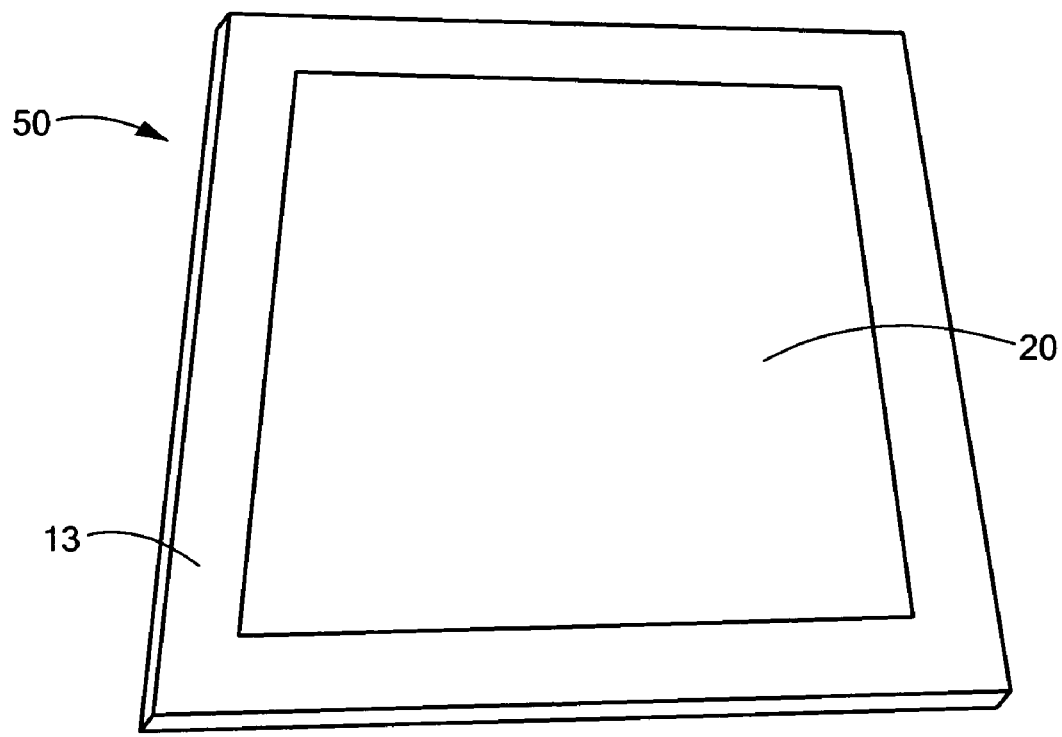
FIG. 6 is a schematic top view showing a composite panel manufactured in accordance with the subject invention prior to removal of the maskant around the border thereof.
Figure 7:
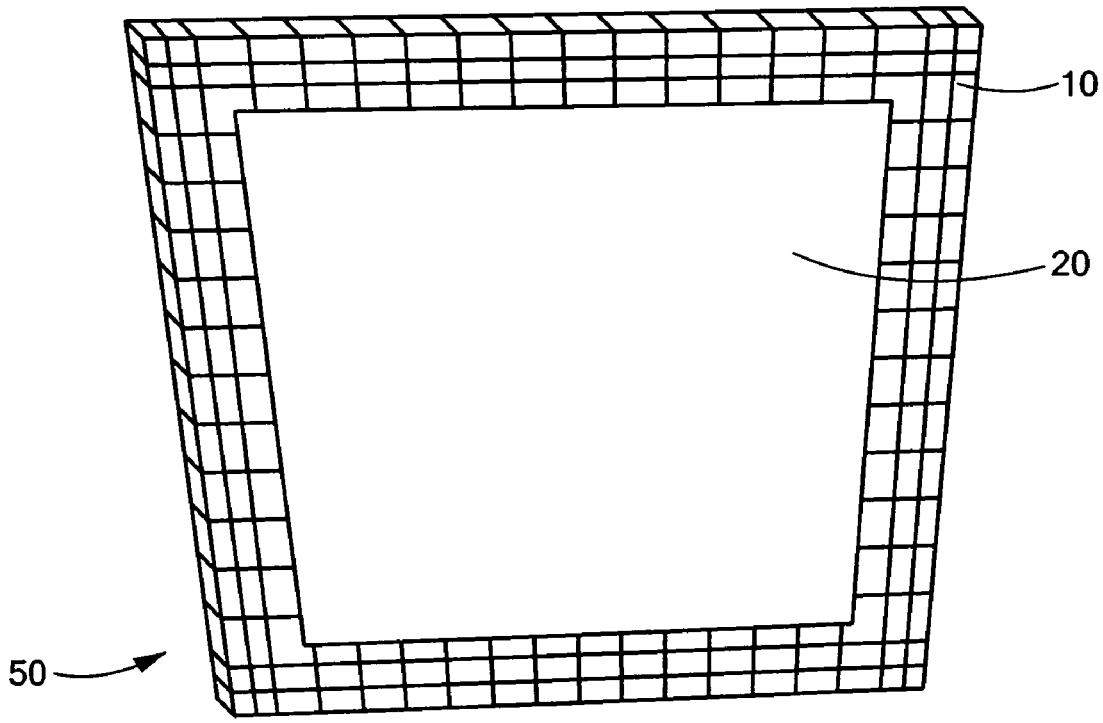
FIG. 7 is a schematic front view showing the composite panel of FIG. 6 after the maskant is removed from the border area thereof.
Figure 8:
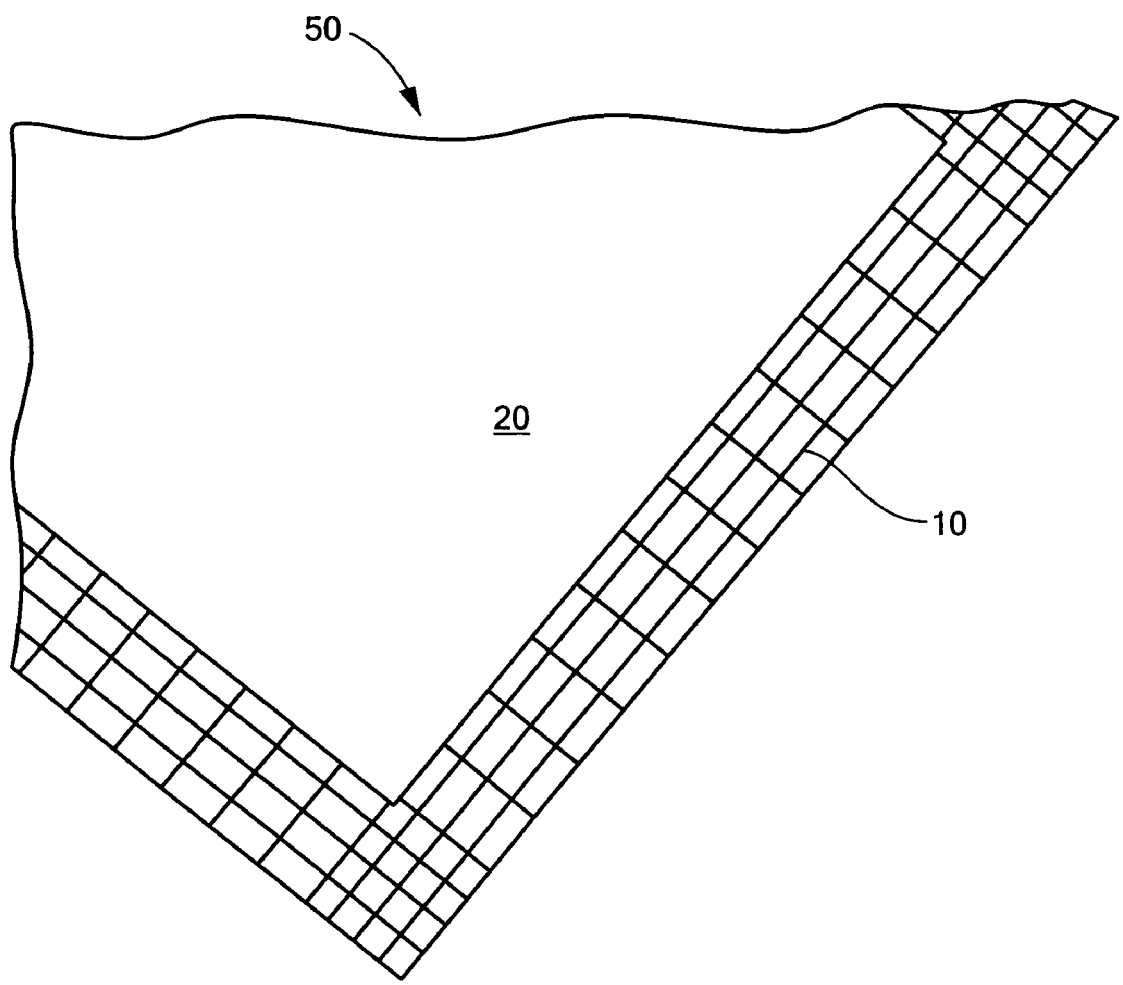
FIG. 8 is a schematic top view showing in more detail the "electrical access" border area of the composite panel shown in FIG. 7.

The result was composite panel 50, FIG. 6 with one composite ply 20 over the metal mesh screen and maskant 14 at the electrical access border area of the now consolidated composite panel. The maskant is then removed, step 40, FIG. 5 using warm water and a brush as shown in FIGS. 7 and 8 where the border area of the metal mesh is free of maskant and resin film from the autoclave curing composite ply consolidation process. This technique can be utilized with other composite fabrication processes, such as, vacuum bag, VARTM (vacuum assisted resin transfer molding), RTM, tape laying, etc.

In the above example, the electrical access area of the resulting composite was the border area of the composite panel but the inventive process outlined above with respect to FIG. 5 may be used to render any desired portion or area of metal mesh, metal foil, or other conductive component of a composite ply lay-up resin free and conductive. Therefore, the result in any embodiment is a composite panel, part, or component rendered conductive at one or more "electrical access areas" by masking the same with the later removable, typically liquid, maskant during the cure cycle of the composite lay-up.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of fabricating a conductive composite, the method comprising:
   coating at least one predetermined electrical access area of a conductive material with a liquid maskant solution;
   curing the liquid maskant solution;
   including the conductive material in a composite ply lay-up;
   curing the lay-up; and
   removing the maskant from the conductive material.

2. The method of claim 1 in which the conductive material is masked by a mask except at the at least one predetermined electrical access area prior to coating and the mask is removed after curing the maskant.

3. The method of claim 2 in which the mask is tape and/or film.

4. The method of claim 1 in which the conductive material is a foil.

5. The method of claim 1 in which the conductive material is a mesh material.

6. The method of claim 5 in which the mesh is made of copper.

7. The method of claim 5 in which the mesh is made of stainless steel.

8. The method of claim 5 in which the mesh material is impregnated with the maskant.

9. The method of claim 1 in which curing includes heating.

10. The method of claim 1 in which the composite ply lay-up includes composite plies under the conductive material and at least one composite ply on the conductive material.

11. The method of claim 10 in which the composite ply on the conductive material does not overlay the at least one predetermined electrical access area of the conductive material.

12. The method of claim 10 in which the composite plies are prepreg sheets.

13. The method of claim 12 in which the prepreg sheets include graphite epoxy.

14. The method of claim 12 in which the prepreg sheets include cynate ester/quartz or other pre-preg combinations of reinforcing fiber and polymeric resins.

15. The method of claim 10 in which the lay-up further includes release sheets.

16. The method of claim 1 in which curing the lay-up includes subjecting the lay-up to elevated temperatures and pressures.

17. The method of claim 1 in which removing the maskant includes brushing the electrical access area with a solution.

18. The method of claim 17 in which the solution is warm water.

19. The method of claim 1 in which the liquid maskant solution is selected to withstand elevated temperatures and pressures used during lay-up curing.

20. A method of fabricating a conductive composite, the method comprising:
   masking all but a predetermined electrical access area of a conductive material with a mask;
   coating the predetermine electrical access area of the conductive material with a liquid maskant;
   curing the liquid maskant;
   removing the mask;
   including the conductive material in a composite ply lay-up with composite plies under the conductive material and at least one composite ply on the conductive material;
   curing the lay-up by subjecting said lay-up to elevated temperatures and pressures; and
   removing the maskant from the conductive material, the maskant selected to withstand the elevated temperatures and pressures used during the lay-up curing step but also removable from the conductive material after curing of the lay-up.

21. A method of fabricating a conductive composite, the method comprising:
   impregnating at least one predetermined electrical access area of a conductive mesh material with a maskant;
   curing the maskant;
   including the conductive material in a composite ply lay-up;
   curing the lay-up; and
   removing the maskant from the conductive material.

22. The method of claim 21 in which the maskant is a liquid water soluable solution.

* * * * *